(12) United States Patent
Ju et al.

(10) Patent No.: US 9,339,784 B2
(45) Date of Patent: May 17, 2016

(54) PLASMA SYNTHESIS OF METAL AND LITHIUM FLUORIDE NANOSTRUCTURES

(71) Applicant: QuantumScape Corporation, San Jose, CA (US)

(72) Inventors: Yiguang Ju, Princeton, NJ (US); Tomoya Wada, New York, NY (US); Nan Yao, Princeton, NJ (US); Wenting Sun, Atlanta, GA (US); Jingning Shan, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 35 days.

(21) Appl. No.: 14/569,950

(22) Filed: Dec. 15, 2014

(65) Prior Publication Data

US 2015/0194661 A1      Jul. 9, 2015

Related U.S. Application Data

(60) Provisional application No. 61/923,230, filed on Jan. 3, 2014.

(51) Int. Cl.
| | |
|---|---|
| *H01M 4/04* | (2006.01) |
| *B01J 19/08* | (2006.01) |
| *C21B 15/00* | (2006.01) |
| *H01M 4/38* | (2006.01) |
| *H01M 4/62* | (2006.01) |
| *H01M 4/36* | (2006.01) |
| *H01M 10/052* | (2010.01) |

(52) U.S. Cl.
CPC .............. *B01J 19/088* (2013.01); *C21B 15/00* (2013.01); *H01M 4/38* (2013.01); *H01M 4/62* (2013.01); *H01M 4/625* (2013.01); *B01J 2219/0805* (2013.01); *B01J 2219/0869* (2013.01); *B01J 2219/0877* (2013.01); *B01J 2219/0894* (2013.01); *H01M 4/366* (2013.01); *H01M 10/052* (2013.01); *Y02T 10/7011* (2013.01)

(58) Field of Classification Search
CPC ............ B01J 19/088; B01J 2219/0869; B01J 2219/0877; B01J 2219/0805; C21B 15/00; H01M 4/366; H01M 4/38; H01M 4/62; H01M 10/052; Y02T 10/7011
See application file for complete search history.

(56) References Cited

U.S. PATENT DOCUMENTS

| 2011/0006254 | A1* | 1/2011 | Richard ................. H01M 4/04 252/182.1 |
| 2014/0050656 | A1* | 2/2014 | Kang .................... H01M 4/485 423/594.6 |
| 2014/0272568 | A1* | 9/2014 | Frianeza-Kullberg H01M 4/505 429/212 |

*Primary Examiner* — Kishor Mayekar
(74) *Attorney, Agent, or Firm* — Squire Patton Boggs (US) LLP

(57) ABSTRACT

Provided are methods and apparatus for forming electrode active materials for electrochemical cells. These materials include a metal (e.g., iron, cobalt), lithium, and fluorine and are produced using plasma synthesis or, more specifically, non-equilibrium plasma synthesis. A metal containing material, organometallic lithium containing material, and fluorine-containing material are provided into a flow reactor, mixed, and exposed to the electrical energy generating plasma. The plasma generation enhances reaction between the provided materials and forms nanoparticles of the electrode active materials. The nanoparticles may have a mean size of 1-30 nanometers and may have a core-shell structure. The core may be formed by metal, while the shell may include lithium fluoride. A carbon shell may be disposed over the lithium fluoride shell. The nanoparticles are collected and may be used to form an electrochemical cell. Besides fluoride components, these methods may be used to form oxides, chlorides, nitrides, and sulfides.

19 Claims, 8 Drawing Sheets

PLASMA SYNTHESIS OF METAL AND LITHIUM FLUORIDE NANOSTRUCTURES

CROSS-REFERENCE TO RELATED APPLICATIONS

This application claims the benefit under 35 U.S.C. §119 (e) of U.S. Provisional Patent Application 61/923,230, entitled: "PLASMA SYNTHESIS OF METAL AND LIF NANOSTRUCTURE" filed on 3 Jan. 2014, which is incorporated herein by reference in its entirety.

BACKGROUND

The present disclosure relates generally to materials used in electrochemical batteries. More particularly, the present disclosure relates to methods and apparatus for forming nanoparticles for used as electrode active materials and/or as electrolytes in electrochemical cells, which may be collectively referred to as battery materials. Merely by way of example, the disclosure has been applied to solid-state electrochemical cells, although there can be other applications.

Advancements in semiconductor and other fields have caused rapid development and adoption various mobile electronic devices, communication devices, electrical and hybrid vehicles and other devices and systems that rely on batteries for power. Some specific examples include portable computers (e.g., laptops), video cameras, cellular phones, and the like. Two prominent mobile electronic examples include IPHONE™ devices supplied by Apple Inc. of Cupertino, Calif. and ANDROID™ devices (operating system developed by Google Inc. in Mountain View, Calif.). Prominent examples among vehicles include electric cars from Tesla Motors Inc. in Fremont, Calif. and hybrid cars from (e.g., Toyota Prius) from Toyota Motor Corporation in Japan. Although highly successful, these battery-powered devices are limited by battery capacity while maintaining adequate level of safety. Many devices also demand high power in addition to high capacity for effective operation. Various types of lithium batteries, such as a lithium ion battery, has been considered and used for these devices. These batteries use liquid electrolytes for transporting ions between positive and negative electrodes during cycling. The liquid electrolyte often contains flammable and/or reactive organic solvents, such as carbonates, that undermine safety and some performance characteristics of these batteries. Some safety device for controlling the temperature, current, voltage, and other characteristics of these batteries have been proposed but are only marginally effective and often cannot protect from catastrophic failures. Lithium batteries having a solid electrolyte have been proposed and demonstrated improved safety. However, most of conventional solid electrolyte systems are expensive to manufacture and/or have poor performance (e.g., discharge rate).

SUMMARY

Provided are methods and apparatus for forming electrode active materials for electrochemical cells. These materials include a non-lithium metal (e.g., iron, cobalt), lithium, and fluorine. The materials are produced using plasma synthesis or, more specifically, non-equilibrium plasma synthesis. A non-equilibrium plasma may be achieved by using different temperatures for ions and electrons or having a particular velocity of one or more species, such as having a velocity distribution that does not follow a Maxwell-Boltzmann distribution. The synthesis may involve providing a non-lithium metal containing material, organometallic lithium containing material, and fluorine-containing material into a flow reactor, mixing these materials, and generating a plasma to drive various chemical reactions between the provided materials. Furthermore, the synthesis may involve providing a non-lithium metal containing material, organometallic lithium containing material, and chlorine containing material into a flow reactor, mixing these materials, and generating a plasma to drive various chemical reactions between the provided materials. Other plasma lithium precursor materials can be used as well. Nanoparticles of the electrode active materials are formed in this plasma environment. The nanoparticles may have a mean size of 1-30 nanometers. In some embodiments, the nanoparticles may have a core-shell structure. The core may be formed by the non-lithium metal, while the shell may include lithium fluoride. Furthermore, an additional carbon shell may be disposed over the lithium fluoride shell. The nanoparticles are collected and may be used to form an electrode of an electrochemical cell or other applications. Besides fluorides, these methods may be used to form oxides, chlorides, nitrides, and sulfides.

In some embodiments, the method for forming an electrode active material for an electrochemical cell involves providing a non-lithium metal containing material, organometallic lithium containing material, and fluorine-containing material. Alternatively, the fluorine-containing material may be combined or substituted with a chlorine-containing material. As such, the method may involve providing a non-lithium metal containing material, organometallic lithium containing material, and chlorine-containing material. While the references below are made to fluorine-containing materials one having ordinary skills in the art would understand that these fluorine-containing materials may be replaced with similar chlorine-containing materials. For brevity, the reference to the chlorine-containing materials is omitted without limiting the scope of this disclosure.

Regardless of using the fluorine-containing material or the chlorine containing material, the materials may be provided in a gas form and may be used directly for plasma generations. In this case, the materials may be provided into a flow reactor. Alternatively, one or more materials may be provided as a liquid and may be evaporated or sprayed prior to delivering this material into the flow reactor. Furthermore, the non-lithium metal containing material may be provided as solid nanoparticles and may be carried into the flow reactor by a carrier gas.

The method may proceed with mixing the non-lithium metal containing material, organometallic lithium containing material, and fluorine-containing material in the flow reactor thereby forming a mixture. In some embodiments, the fluorine-containing material may be fully or partially replaced with a chlorine-containing material in this mixture. For example, the materials may be flown through a mixing device, shower head, or mixed for the first time when introduced into the chamber. The mixing procedure depends on reactivity of the provided materials.

The method may proceed with applying an electrical energy to the mixture using an energy source. For example, the flow reactor may include two electrodes and a high voltage may be applied to these electrodes to generate a discharge through the electrodes. When the energy is applied, the plasma is formed in the mixture. Plasma generation stimulates the chemical reaction between the materials, which in turn results in forming nanoparticles of the electrode active material. The nanoparticles includes a non-lithium metal from the non-lithium metal containing material, lithium from the organometallic lithium containing material, fluorine from the fluorine-containing material (and/or chlorine from the chlorine-containing material), and carbon. The carbon source can be one of the non-lithium metal containing material, organometallic lithium containing material, and/or fluorine-containing material (and/or the chlorine-containing material). In some embodiments, the carbon source is the organometallic lithium containing material. Alternatively, the carbon source is the non-lithium metal containing material. Furthermore, the carbon source may be fluorine-containing material (and/or the chlorine-containing material). The nanoparticles may have the mean particle size ranging 1 nanometer to 30 nanometers. In some embodiments, the mean particle size ranges 1 nanometer to 20 nanometers. More specifically, the mean particle size ranges 1 nanometer to 10 nanometers.

In some embodiments, the method also include evaporating one or precursors thereby forming one or more of the non-lithium metal containing material, the organometallic lithium containing material, and the fluorine-containing material (and/or the chlorine-containing material). For example, a precursor may be provided in a liquid form, and it is evaporated prior to supplying into the flow reactor. Specifically, evaporating the precursor of the organometallic lithium containing material may form the organometallic lithium containing material. In some embodiments, a precursor provided in a liquid form is sprayed. While spraying may be viewed as a technique alternative to evaporation, spraying may enhance evaporation of the precursor. This precursor of the organometallic lithium containing material may include a solvent having a boiling temperature of less 100° C. and being free from oxygen. One example of a suitable solvent is hexane. In the same or other embodiments, the process may involve evaporating a precursor of the fluorine-containing material (and/or the chlorine-containing material). This precursor of the fluorine-containing material is solid.

In some embodiments, the non-lithium metal containing material or a precursor of the non-lithium metal containing material includes at least one of ferrocene ($Fe(C_5H_5)_2$), cobaltocene ($Co(C_5H_5)_2$), iron pentacarbonyl ($Fe(CO)_5$), dicobaltoctacarbonyl ($Co_2(CO)_8$), and iron chloride ($FeCl_3$). One example of the non-lithium metal containing material or a precursor of the non-lithium metal includes ferrocene (Fe $(C_5H_5)_2$). Another example of the non-lithium metal containing material or a precursor of the non-lithium metal includes cobaltocene ($Co(C_5H_5)_2$). Another example of the non-lithium metal containing material or a precursor of the non-lithium metal includes iron pentacarbonyl ($Fe(CO)_5$). Another example of the non-lithium metal containing material or a precursor of the non-lithium metal includes dicobaltoctacarbonyl ($Co_2(CO)_8$). Another example of the non-lithium metal containing material or a precursor of the non-lithium metal includes iron chloride ($FeCl_3$). These materials may be used to form nanoparticles including iron and/or cobalt. Specifically, iron and/or cobalt may form cores of core-shell nanoparticles. For brevity, a non-lithium metal may be referred to as a metal, while a non-lithium metal containing material may be referred to as a metal containing material.

In some embodiments, the organometallic lithium containing material or a precursor of the organometallic lithium containing material includes at least one of alkyl lithium and lithium 2,2,6,6-tetramethyl-3,5-heptanedionate. For example, the organometallic lithium containing material or a precursor of the organometallic lithium containing material may include alkyl lithium. Alternatively the organometallic lithium containing material or a precursor of the organometallic lithium containing material may include lithium 2,2,6,6-tetramethyl-3,5-heptanedionate. The alkyl lithium may be at least one of butyl lithium, methyl lithium, and hexyl lithium. In some embodiments, the fluorine-containing material or a precursor of the fluorine-containing material includes at least one of ammonium bi-fluoride ($NH_4HF_2$) and ammonium fluoride ($NH_4F$). Specifically, the fluorine-containing material or a precursor of the fluorine-containing material may include ammonium bi-fluoride ($NH_4HF_2$). Alternatively, the fluorine-containing material or a precursor of the fluorine-containing material may include ammonium fluoride ($NH_4F$). In some embodiments, the containing material or a precursor of the chlorine-containing material includes at least one of ammonium bi-chloride ($NH_4HCl_2$) and ammonium chloride ($NH_4Cl$). Specifically, the chlorine-containing material or a precursor of the chlorine-containing material may include ammonium bi-chloride ($NH_4HCl_2$). Alternatively, the chlorine-containing material or a precursor of the chlorine-containing material may include ammonium chloride ($NH_4F$).

In some embodiments, the atomic ratio of the non-lithium metal of the non-lithium metal containing material to lithium of the organometallic lithium containing material is about 1:3. In the same or other embodiments, the atomic ratio of the non-lithium metal of the non-lithium metal containing material to fluorine of the fluorine-containing material is about 1:1. Likewise, the atomic ratio of the non-lithium metal of the non-lithium metal containing material to chlorine of the chlorine-containing material is about 1:1. These ratios may be used to control the composition of the nanoparticles formed using these materials.

The flow reactor pressure may be maintained at between about 5 Torr and 500 Torr. More specifically, the flow reactor pressure may be maintained at between about 10 Torr and 100 Torr. The energy source may include a pair of electrodes exposed to the mixture when applying the energy to the mixture. The energy may be applied in pulses.

In some embodiments, the method also involves, prior to forming the mixture, forming the non-lithium metal containing material from the precursor of the non-lithium metal containing material. The non-lithium metal containing material may be in the form nanoparticles. Forming the non-lithium metal containing material may involve applying energy to the precursor of the non-lithium metal containing material, which forms plasma from the precursor of the non-lithium metal containing material. Each of the nanoparticles of the electrode active material may include a non-lithium metal core and a lithium fluoride shell. The non-lithium metal core may be effectively preformed.

In some embodiments, the method also involves fabricating a positive electrode using the nanoparticles of the electrode active material. For example, the positive electrode may be coated using slurry formed with the nanoparticles. Other methods of attaching the nanoparticles to the current collector substrate may be used as well. Furthermore, the method may involve fabricating the electrochemical cell using the positive electrode formed from the nanoparticles of the electrode active material.

Also provided is an apparatus for forming the electrode active material for an electrochemical cell. The apparatus is used to execute the methods described in this disclosure. The apparatus may include a feed device having a first delivery line for a non-lithium metal containing material, a second delivery line for an organometallic lithium containing material, and a third delivery line for a fluorine-containing material (and/or for a chlorine-containing material). In some embodiments, the feed device may be used to prepare one or more materials, such as evaporate precursors to form the materials.

In some embodiments, the feed device may be used to spray precursors to form the materials. The apparatus may also include a flow reactor connected to the first delivery line, the second delivery line, and the third delivery line. In some embodiments, the delivery lines may be fed into the showerhead type of device. The flow reactor is configured to mix the non-lithium metal containing material, organometallic lithium containing material, and fluorine-containing material (and/or a chlorine containing material) and to form a mixture of these materials. The apparatus may also include an energy source coupled to the flow reactor to apply energy to the mixture of the materials and forming plasma from this mixture. The apparatus may also include a collector coupled to the flow reactor to capture nanoparticles of the electrode active materials formed from the mixture when the plasma is formed.

Overall, the describes methods, apparatus for performing these methods, and nanoparticles of the electrode active materials formed by these methods can be used for a variety of applications, such as high energy density batteries and other energy conversion systems. In some embodiments, the method, which may be also referred to as a synthesis process, includes one or more short pulses (e.g., 1 picosecond to 1 microsecond in pulse width) and strong electric field (e.g., 100-1000 Td) of non-equilibrium plasma discharges. The plasma may be formed in a reactor maintained at a low pressure or at an elevated pressure (1-1520 Torr). In some embodiments, the plasma may be formed in a reactor maintained at 50-100 Torr. The non-lithium metal containing material, organometallic lithium containing material, and/or fluorine-containing material (and/or chlorine-containing material) can be prepared by sublimation and/or vaporization of solid and/or liquid precursors to form materials that ate used for plasma formation. One or more gas materials may be mixed with a carrier gas (e.g., helium and/or argon) and subjected to the plasma discharge. In some embodiments, a solid material (e.g., a solid non-lithium metal containing material) may be used without any sublimation and the solid particles may be fed into the reactor. Core-shell nanoparticles of the electrode active material can be produced in a single or multiple plasma discharge process. In some embodiments, the nanoparticles have a mean particle size ranging 1 nanometer to 30 nanometers. The nanoparticles of the electrode active material may be collected by using an electrostatic method. The collected nanomaterials may be examined using a wide range of microscopic analysis techniques such as scanning electron microscope (SEM), transmission electron microscope (TEM), selected area electron diffraction (SAED), and/or high resolution x-ray diffraction (HRXRD).

In some embodiments, a method is used to form an energy storage device, such as a rechargeable electrochemical cell. More specifically, the method involves forming an electrode active material that is used to form a positive electrode active material, which may be integrated into the electrochemical cell. The method may commence with providing a non-lithium metal containing material, organometallic lithium containing material, and fluoride containing material. In some embodiments, the method also involves forming one or more of these materials by evaporating and/or sublimating corresponding precursors, such as evaporating and/or sublimating a precursor to form the organometallic lithium containing material, evaporating and/or sublimating a precursor to form the fluorine-containing material (and/or from the chlorine-containing material). One or more liquid precursors may be also sprayed. The method proceeds with mixing the gaseous materials in a flow reactor and subjecting the mixture to an energy source causing formation of a uniform plasma environment. For purposes of this disclosure, the uniform plasma environment is defined as a plasma environment that has no local arcing or hot spots. The short pulse duration may be used for the uniformity of plasma and the subsequently formed nanoparticles. The method includes forming nanoparticles of electrode active material, each particle including lithium, fluorine, carbon, and non-lithium metal. In some embodiments, each particle includes lithium, chlorine, carbon, and non-lithium metal. The nanoparticles may have a mean particle size ranging 1 nanometer to 30 nanometers These and other embodiments are described further below with reference to the figures.

DETAILED DESCRIPTION

Figure 1:
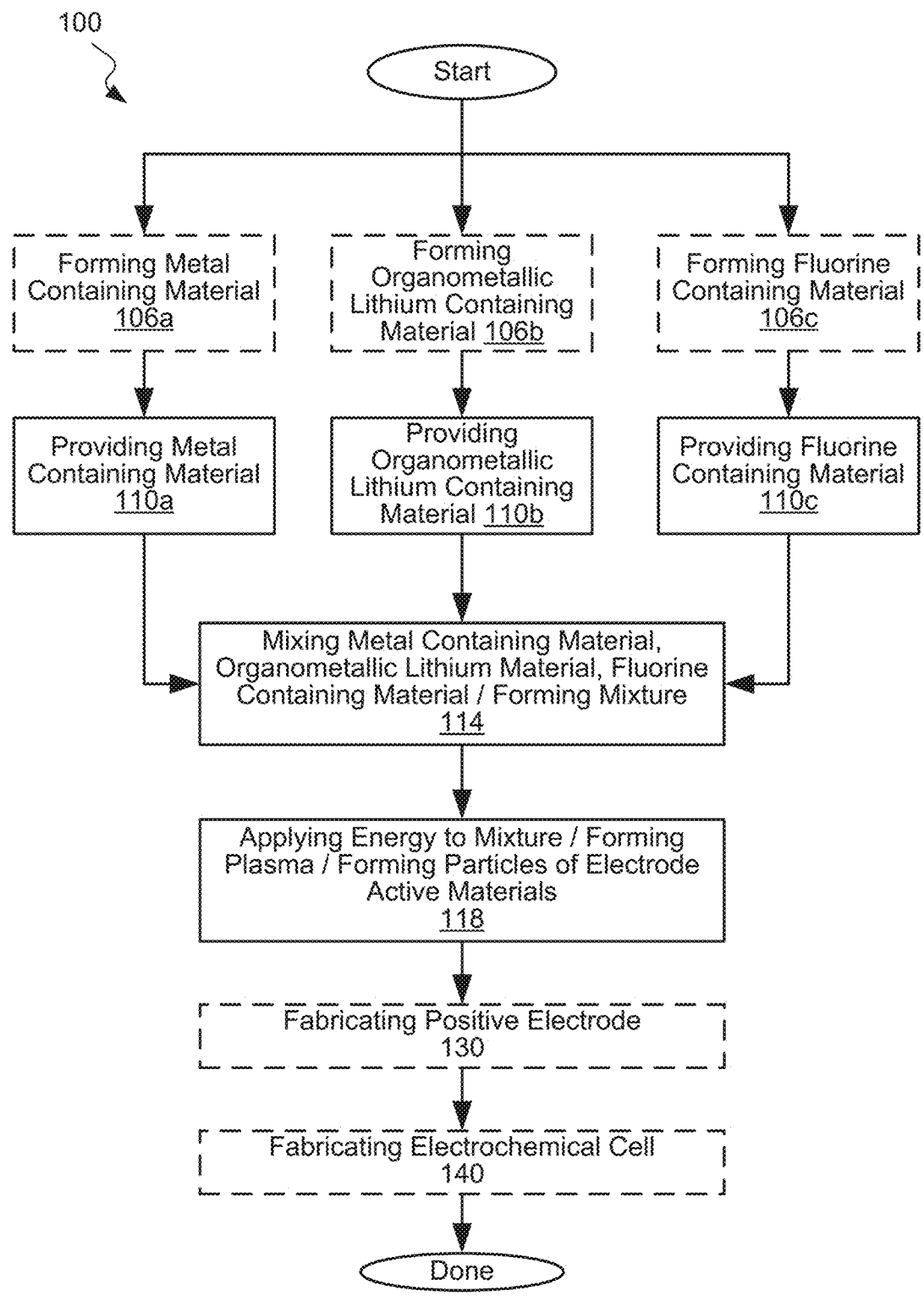
FIG. 1 is a process flowchart of a method for forming an electrode active material for an electrochemical cell, in accordance with some embodiments.

The disclosure presents methods for forming electrode active materials for electrochemical cells, apparatus to perform these methods, and the electrode active materials formed using these methods. In some embodiments, a method involves a repetitive short pulse (e.g., from 1 picosecond to 1 microsecond in pulse width) of energy applied for plasma generation. The method may involve forming a non-equilibrium plasma to synthesize the electrode active materials. The synthesized electrode active materials may include core-shell structured nanoparticles that include non-lithium metal, lithium, fluorine, and carbon. The describe process may involve uniform and continuous plasma discharge at a low temperature and/or an elevated pressure, which greatly increases the product yield and improves the uniformity of size distribution of nanoparticles. Moreover, this process provides good control of nanomaterial designs, such as core-shell structures of nanoparticles, which can be used for applications in high energy density batteries and efficient catalysts.

The following description is presented to enable one of ordinary skill in the art to make and use the disclosure and to incorporate it in the context of particular applications. Various modifications, as well as a variety of uses in different applications will be readily apparent to those skilled in the art, and the general principles defined herein may be applied to a wide range of embodiments. Thus, the present disclosure is not intended to be limited to the embodiments presented, but is to be accorded the widest scope consistent with the principles and novel features disclosed herein.

In the following detailed description, numerous specific details are set forth in order to provide a more thorough understanding of the present disclosure. However, it will be apparent to one skilled in the art that the present disclosure may be practiced without necessarily being limited to these specific details. In other instances, well-known structures and devices are shown in block diagram form, rather than in detail, in order to avoid obscuring the present disclosure.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Processing Examples

FIG. 1 is a process flowchart of method 100 for forming an electrode active material for an electrochemical cell, in accordance with some embodiments. Method 100 may be a standalone process (e.g., a process of fabricating active materials) or a part of the overall cell fabrication process. The equipment used to conduct various operations of method 100 is described below with reference to FIG. 3.

In some embodiments, method 100 commences with forming a non-lithium metal containing material during optional operation 106a, forming an organometallic lithium containing material during optional operation 106b, and/or forming a fluorine-containing material during optional operation 106c. If one or more of these materials are provided in a ready to use form, then operation 106a, operation 106b, and/or operation 106c may be skipped. For example, the non-lithium metal containing material, organometallic lithium containing material, and fluorine-containing material may be provided in gaseous form and method 100 may commence with operations 110a-110c and proceed to mixing operation 114 further described below.

Examples of suitable non-lithium metal containing materials or suitable precursors for non-lithium metal containing gaseous, liquid, and solid organic materials include but are not limited to ferrocene ($Fe(C_5H_5)_2$), cobaltocene ($Co(C_5H_5)_2$), iron pentacarbonyl ($Fe(CO)_5$), dicobaltoctacarbonyl ($Co_2(CO)_8$), iron chloride ($FeCl_3$), and iron nitrates ($Fe(NO_3)_3$). One example of a suitable non-lithium metal containing material or a suitable precursor for non-lithium metal is ferrocene ($Fe(C_5H_5)_2$). Another example of a suitable non-lithium metal containing material or a suitable precursor for non-lithium metal is cobaltocene ($Co(C_5H_5)_2$). Another example of a suitable non-lithium metal containing material or a suitable precursor for non-lithium metal is iron pentacarbonyl ($Fe(CO)_5$). Another example of a suitable non-lithium metal containing material or a suitable precursor for non-lithium metal is dicobaltoctacarbonyl ($Co_2(CO)_8$). Another example of a suitable non-lithium metal containing material or a suitable precursor for non-lithium metal is iron chloride ($FeCl_3$). Another example of a suitable non-lithium metal containing material or a suitable precursor for non-lithium metal is iron nitrates ($Fe(NO_3)_3$). In some embodiments, these materials may be used as precursors to form nanoparticles including iron and/or cobalt. These nanoparticles may be used as materials (in a solid form) during operation 114.

Examples of suitable organometallic lithium containing materials or suitable precursors for organometallic lithium containing materials include but are not limited to alkyl lithium and lithium 2,2,6,6-tetramethyl-3,5-heptanedionate (in liquid or vapor phase) as well as lithium chloride and lithium nitrates (in solid or liquid solution phase). The alkyl lithium may be at least one of butyl lithium, methyl lithium, and hexyl lithium. Other plasma suitable precursors can be used as well.

Examples of suitable fluorine-containing materials or suitable precursors for fluorine-containing gaseous materials include but are not limited to ammonium bi-fluoride ($NH_4HF_2$), ammonium fluoride ($NH_4F$), and hydrogen fluoride HF. In some embodiments, a fluorine-containing material or a suitable precursor for the fluorine-containing gaseous material includes ammonium bi-fluoride ($NH_4HF_2$). Alternatively, a fluorine-containing material or a suitable precursor for the fluorine-containing gaseous material may include ammonium bi-fluoride ($NH_4HF_2$). Furthermore, a fluorine-containing material or a suitable precursor for the fluorine-containing gaseous material may include ammonium fluoride ($NH_4F$). Also, a fluorine-containing material or a suitable precursor for the fluorine-containing gaseous material may include hydrogen fluoride HF.

In some embodiments, the atomic ratio of the metal of the metal containing material to lithium of the organometallic lithium containing material is about the ion charge ratio of the metal and lithium. For example, if the metal is $Fe^{3+}$, then the ratio is about 1:3.

In the same or other embodiments, the atomic ratio of the metal of the metal containing material to fluorine of the fluorine-containing material is also varied between about 1.5:1 to 1:4 depending on the ion charge of the metal. For example, the atomic ratio of the metal of the metal containing material to fluorine of the fluorine-containing material may be about 1:1 to 1:3. More specifically, the atomic ratio of the metal of the metal containing material to fluorine of the fluorine-containing material may be about 1:1.5 to 1:2. The composition of the carbon deposit can be controlled by addition of hydrogen into the precursor flow, for example, to reduce carbon composition in the plasma discharge.

In some embodiments, method 100 also include evaporating and/or sublimating one or more precursors thereby forming one or more of the metal containing material, the organometallic lithium containing material, and/or the fluorine-containing material during optional operation 106a, operation 106b, and/or operation 106c. For example, a precursor may be provided in a liquid form and it is evaporated prior to supplying into the flow reactor. Specifically, evaporating the precursor of the organometallic lithium containing material may form the organometallic lithium containing material. This precursor of the organometallic lithium containing material may include a solvent having a boiling temperature of less 100° C. and being free from oxygen. One example of a suitable solvent is hexane. In the same or other embodiments, the process may involve evaporating or, more specifically, sublimating a precursor of the fluorine-containing material. This precursor of the fluorine-containing material is solid, for example, lithium fluoride and lithium chloride. In some embodiments, one or more operation 106a, operation 106b, and/or operation 106c involve spraying one or more of the metal containing material, the organometallic lithium containing material, and/or the fluorine-containing material. As noted above, a fluorine-containing material may be replaced partially or completely with a chlorine-containing material.

In some embodiments, all three materials may be provided in a gas form. Alternatively, the metal containing material may be provided as solid nanoparticles and may be carried by a carrier gas. The materials may be provided into a flow reactor.

In some embodiments, the method also involves, prior to forming the mixture, forming the metal containing material from the precursor of the metal containing material. The metal containing material may be in the form nanoparticles. Forming the metal containing material may involve applying energy to the precursor of the metal containing material, which forms plasma in the precursor of the metal containing material. The dissociation of the metal containing materials by plasma creates the nucleation and growth of the metal nanoparticles. In some embodiments, this operation may be performed in a processing chamber that is different from the flow chamber described below with reference to operations 114 and 118.

In some embodiments, the method also involves activating one or more precursors using a thermal technique, chemical, mechanical, or other techniques to form one or more of the metal containing material, organometallic lithium containing material, and fluorine-containing material.

Method 100 may proceed with mixing the metal containing material, organometallic lithium containing material, and fluorine-containing material thereby forming a mixture during operation 114. This mixing may be performed in the flow reactor. For example, the mixing may be performed in a showerhead of the flow reactor and the materials may be released into the chamber of the flow reactor as a mixture. The mixture may also include one or more inert gases, such as argon, helium, nitrogen, or other gas such as hydrogen. The inert gas may be inert and diffusive to increase the uniformity of the plasma. In some embodiments, a flow rate of a carrier gas may be between about 0.1 liters per minute to 1 liter per minute.

Method 100 may proceed with applying energy to the mixture using an energy source during operation 118. When the energy is applied, plasma is formed in the mixture, which in turn results in forming nanoparticles of the electrode active material. Specifically, a voltage, for example between 1 and 40 kV. may be applied between two electrodes positioned within the flow reactor.

Short pulses (e.g., 1 picosecond to 1 microsecond) may be used in combination with a strong electric field thereby creating the non-equilibrium plasma. A strong electric field is needed to effectively and selectively dissociate the chemical bonds without thermal dissociation. The short pulsed discharge helps to form uniform plasma discharge at elevated pressure, such as 100-1500 Torr. These conditions create an environment for fast bond breaking, high yield, metal, alloy, and non-oxide nanoparticle synthesis. In addition, due to the low gas temperature (e.g., between about 300 K and 700 K) and high electron temperature discharge (e.g., between about 1 eV and 30 eV), the nanoparticles are charged during processing and the surface temperature of the nanoparticles is high thereby allowing for faster kinetics and more favorable thermodynamic conditions. Furthermore, these process conditions allow forming non-agglomerated core-shell structured nanoparticles.

In some embodiments, a single non-equilibrium plasma discharge is used. Alternatively, a dual non-equilibrium plasma discharge is used to synthesize core-shelled structures or composite nanomaterials.

The pressure of the flow reactor pressure may be maintained at between about 1 Torr and 1000 Torr. More specifically, the pressure of the flow reactor pressure may be maintained at between about 10 Torr and 100 Torr. The pressure is adjusted to increase the yield of materials synthesis while maintaining the uniformity of the plasma discharge.

The energy source may include a pair of electrodes exposed to the mixture when applying the energy to the mixture. The energy may be applied in pulses. The pair of electrodes is coupled to an energy source such that the energy source comprises a repetitive, short pulsed plasma (1-100 ns) characterized by a temperature ranging from 300-1000 K; pressure ranging from 50-760 Torr; and a power supply configured to create a repetitive plasma pulses and having a pulse width of 1-100 ns, voltage of 1-40 kV, and repetition rate of 1-40 kHz.

In some embodiments, after conducting operation 118, additional deposition operations may be performed. For example, the nanoparticles formed during operation 118 may be additional process using the same or different organometallic lithium material and/or the same or/different fluorine-containing materials. Multi-stage processing may be used to synthesize core-shelled structures or composite nanomaterials to improve the functionality of the materials.

In some embodiments, the materials crystal structure, composition, particle size, and distribution are analyzed using X-ray diffraction (XRD), scanning electron microscopy (SEM), and high-resolution transmission electron microscopy (HRTEM). This analysis may be used as a part of the quality control in the production, process development, or research and development.

Method 100 may also involve fabricating a positive electrode using the nanoparticles of the electrode active material during optional operation 130 and fabricating the electrochemical cell using the positive electrode during optional operation 140.

As used herein, the phrase "slot casting," refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 micrometers.

As used herein, the phrase "dip casting" or "dip coating" refers to a deposition process whereby substrate is coated, or deposited, with a solution, liquid, slurry, or the like, by moving the substrate into and out of the solution, liquid, slurry, or the like, often in a vertical fashion.

As used herein the phrase "casting a film," refers to the process of delivering or transferring a liquid or a slurry into a mold, or onto a substrate, such that the liquid or the slurry forms, or is formed into, a film. Casting may be done via doctor blade, Meyer rod, comma coater, gravure coater, micro-gravure, reverse comma coater, slot dye, slip and/or tape casting, and other methods known to those skilled in the art.

In some other examples, powders synthesized herein are optionally mixed with flux components and also a liquid or solvent in order to prepare a slurry of these components. The slurry is then cast onto a substrate to form a film having a thickness between about 10 nm and about 250 micrometers. In some examples, the casting onto a substrate is accomplished through slot casting, doctor blade casting, or by dip coating a substrate into the flux. The slurry is then dried to remove the solvent and, optionally, melt and mix the flux components and the powders. In some examples, the heating is accomplished at 1° C./min and to a temperature of about 200° C., or about 250° C., or about 300° C., or about 350° C., or about 350° C., or about 400° C., or about 450° C., or about 500° C. In some examples, more flux than synthesized powders are used so as to completely dissolve the powders in the flux. In other examples, more synthesized powders than flux is used to as not to dissolve all of the powders in the flux.

In some examples, the mixture is milled according to the milling methods set forth in the instant patent application. In some examples, the mixture is formulated as a slurry of milled precursor materials to form a slurry. In some examples, the slurry is then coated onto a substrate by methods such as, but not limited to, doctor blade casting, slot casting, or dip coating. In some other examples, the slurry is cast onto a substrate according to a casting method set forth in the instant patent application. In some of these examples, the slurry is then dried to remove the solvent or liquid therein. In some examples, the dried slurry is calendered. In some additional examples, the dried slurry is laminated to other layers of battery components. In some of these examples, pressure is applied to adhere or bond the laminated layers together. In certain examples, the dried slurry layers to which pressure is applied are sintered according to the methods set forth herein.

Electrochemical Material Examples

The synthesized nanoparticles include a non-lithium metal, lithium, fluorine, and carbon. In some embodiments, the amount of the non-lithium metal in the nanoparticles may be between about 1% atomic and 50% atomic. More specifically, the amount of the non-lithium metal in the nanoparticles may be between about 5% atomic and 10% atomic. The amount of lithium in the nanoparticles may be between about 1% atomic and 50% atomic. More specifically, the amount of lithium in the nanoparticles may be between about 20% atomic and 30% atomic. The amount of fluorine in the nanoparticles may be between about 1% atomic and 50% atomic. More specifically, the amount of fluorine in the nanoparticles may be between about 20% atomic and 30% atomic. The amount of carbon in the nanoparticles may be between about 1% atomic and 50% atomic. More specifically, the amount of carbon in the nanoparticles may be between about 10% atomic and 30% atomic. The carbon content can be controlled by introducing hydrogen in the inert gas stream.

In some embodiments, the non-lithium metal is either iron, cobalt, or both. Specifically, the non-lithium metal may be iron. Alternatively, the non-lithium metal may be cobalt. Furthermore, the non-lithium metal may be a combination of iron and cobalt.

The synthesized nanoparticles may include a metal core and a lithium fluoride shell. Carbon, if present, may form composite nanoparticles. Carbon may be present in the shell and/or in the core. In some embodiments, carbon is present in the shell. Alternatively, carbon is present in the core. Furthermore, carbon may be present in both shell and core.

In some embodiments, the nanoparticles are substantially free from oxygen and further oxidation is avoided. If oxygen is present, hydrogen may be added to reduce/remove the oxygen content in nano-materials.

Figure 2A:
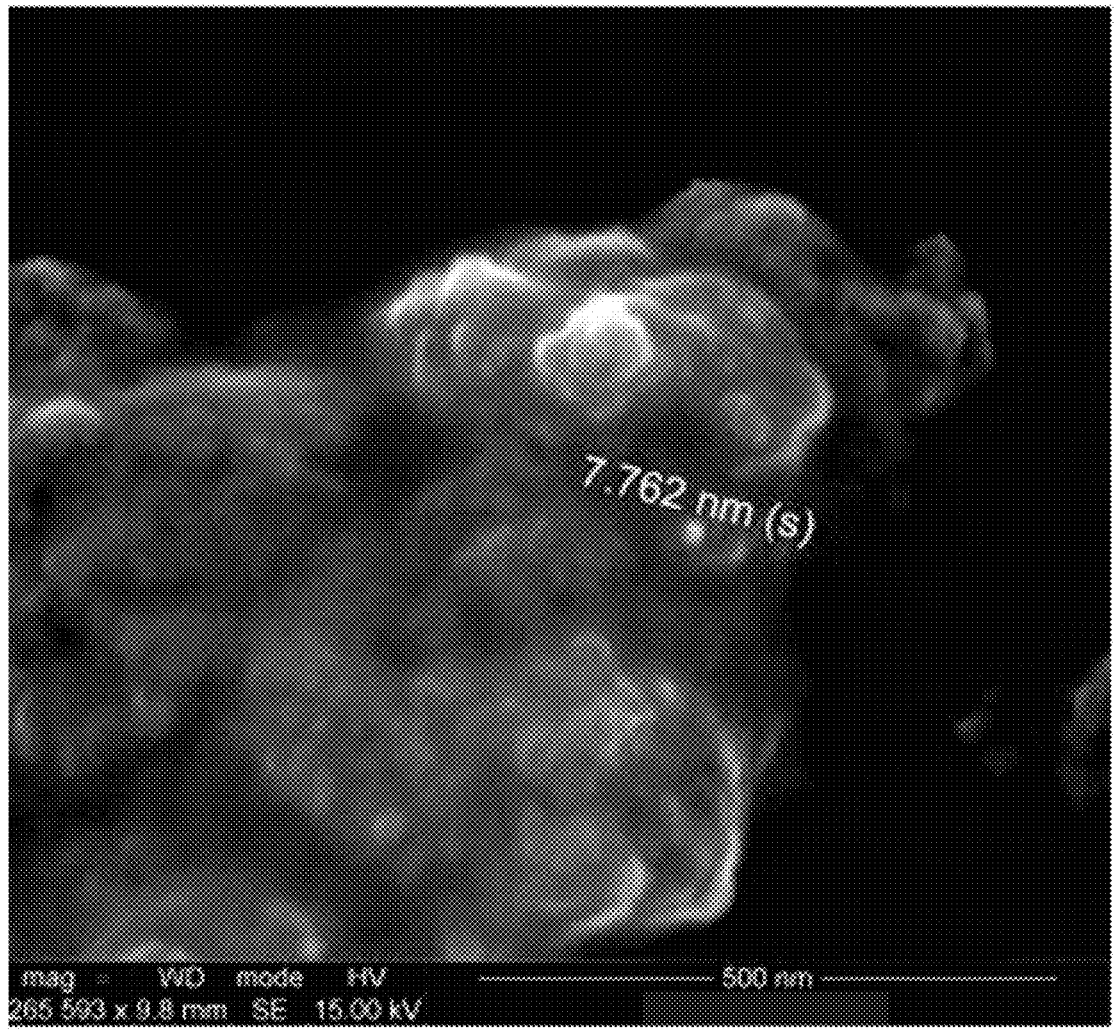
FIG. 2A is an SEM image iron nanoparticles for electrode active materials, in accordance with some embodiments.
Figure 2B:
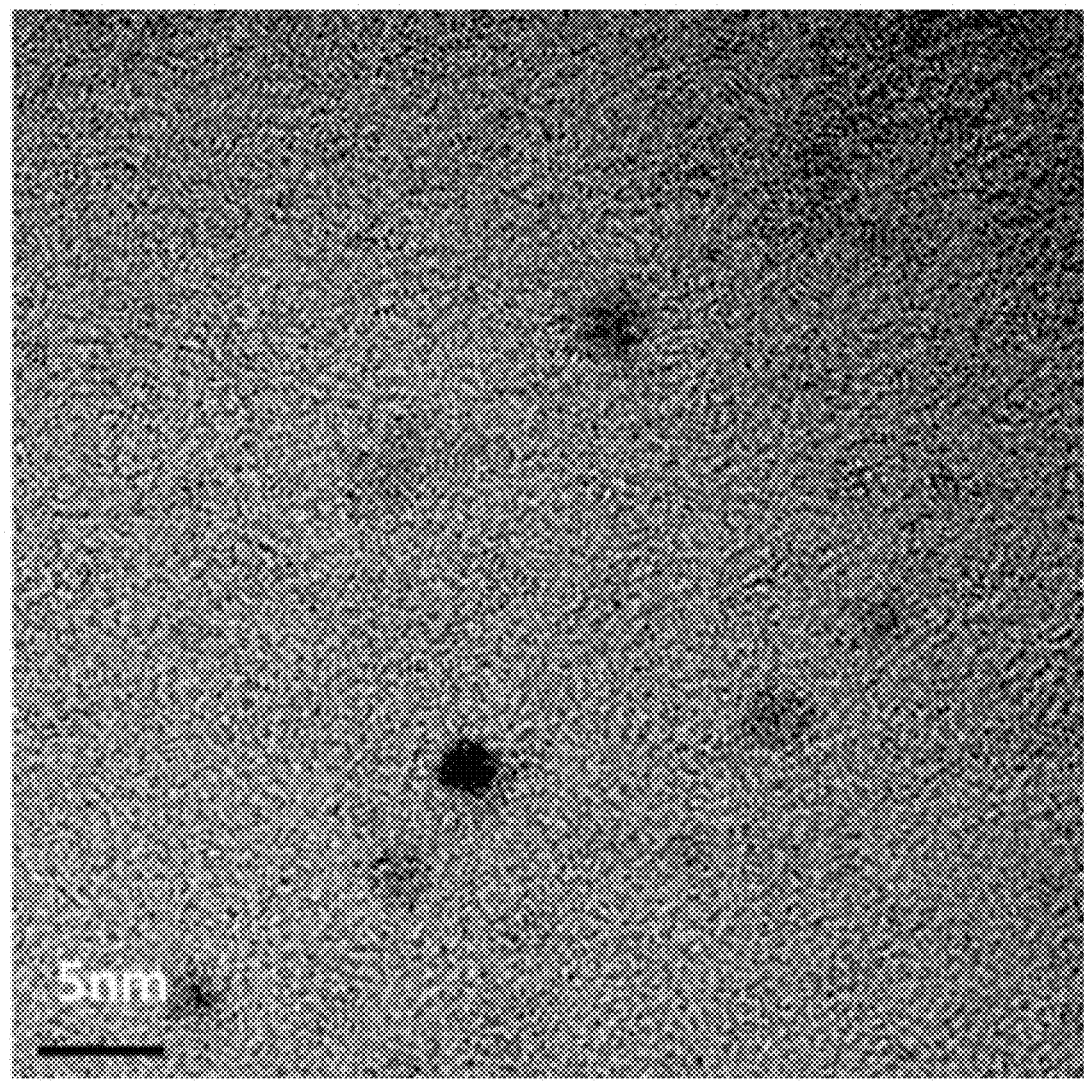
FIG. 2B is a TEM image of nanoparticles similar to the nanoparticles in FIG. 2A, in accordance with some embodiments.

FIG. 2A is an SEM image of iron nanoparticles synthesized by non-equilibrium plasma discharge from the vapor of metal contain materials used to form electrode active materials, in accordance with some embodiments. FIG. 2B is a TEM image of the same iron nanoparticles.

Figure 2C:
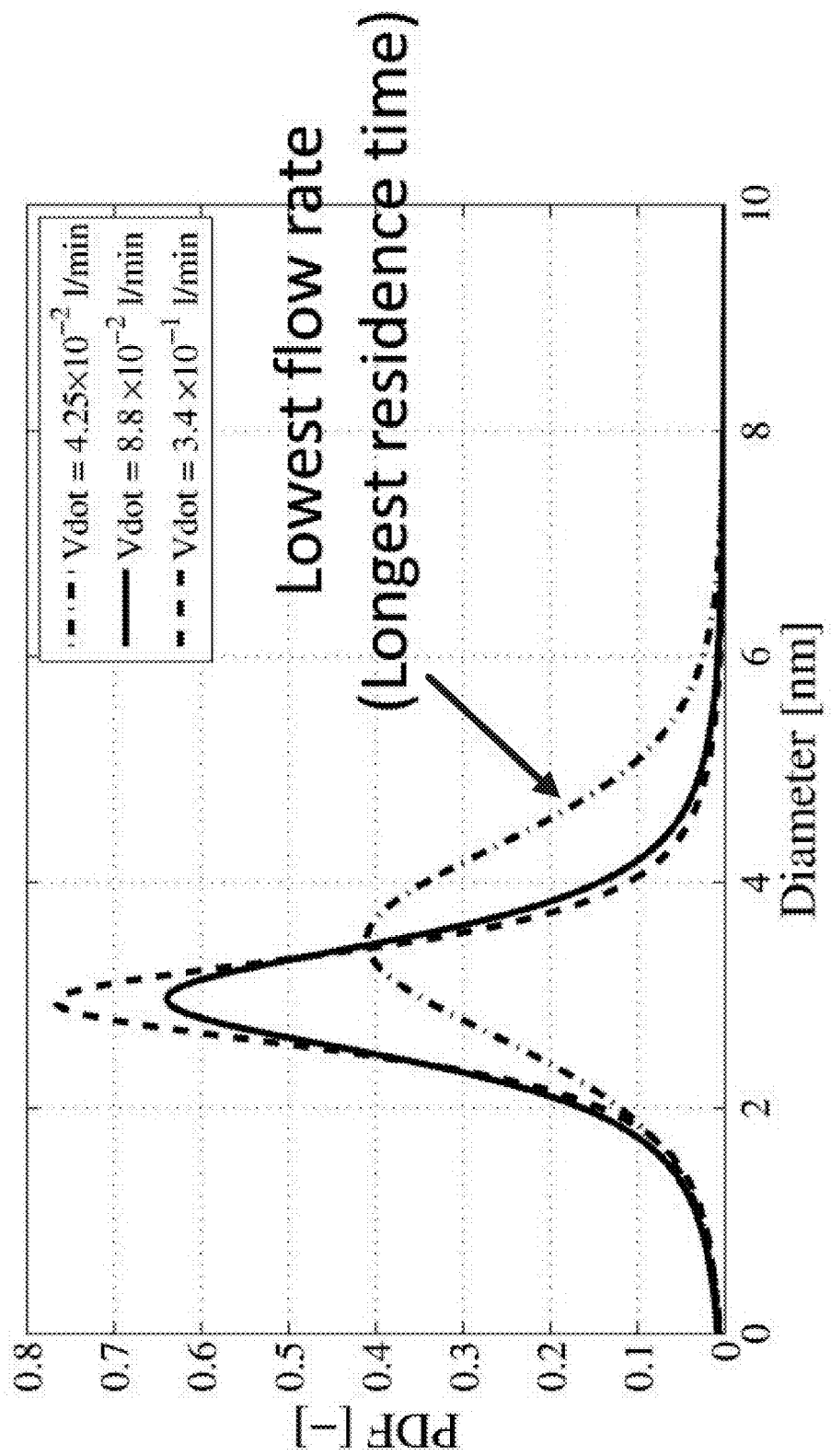
FIG. 2C is a plot representing a particle size distribution of the iron nanoparticles also shown in FIGS. 2A and 2B, in accordance with some embodiments.

FIG. 2C is a plot representing a particle size distribution of the iron nanoparticles. As shown, the plasma synthesis produces nanoparticles with the controllable particle size with high monodispersity. The monodispersity is due to the charge accumulation on the particle surface to avoid agglomeration and the short residence time in the reactor The particle size may be controlled using different residence durations, which may be referred to as processing time, in a flow reactor. In FIG. 2C, Vdot denotes the flow rate of the precursor flow. A low flow rate corresponds longer residence time in this example. It would be appreciated by one having ordinary skills in the art that the substantially uniform size distribution of the iron nanoparticles causes good ionic conductivity and performance suitable for positive active material of electrochemical cells.

Figure 2D:
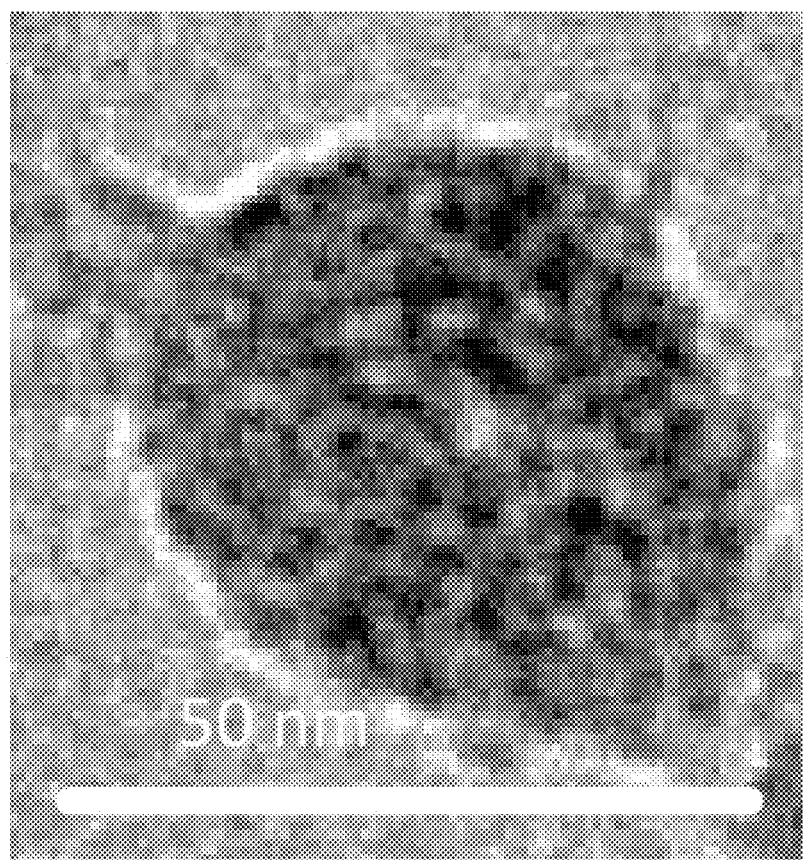
FIG. 2D is a TEM image of lithium fluoride nanoparticles, in accordance with some embodiments.

FIG. 2D is a TEM image of lithium fluoride nanoparticles formed by using plasma discharge in a gaseous mixture of ammonium bi-fluoride ($NH_4HF_2$) and ethyl-lithium. Overall, the plasma synthesis produces iron primary nanoparticles having an average particle size of about 5 nanometers, and lithium fluoride particle clusters with an average particle size of about 50 nanometers. Note that the lithium fluoride particle clusters are composed by smaller (~10 nanometers) lithium fluoride particles.

Figure 2E:
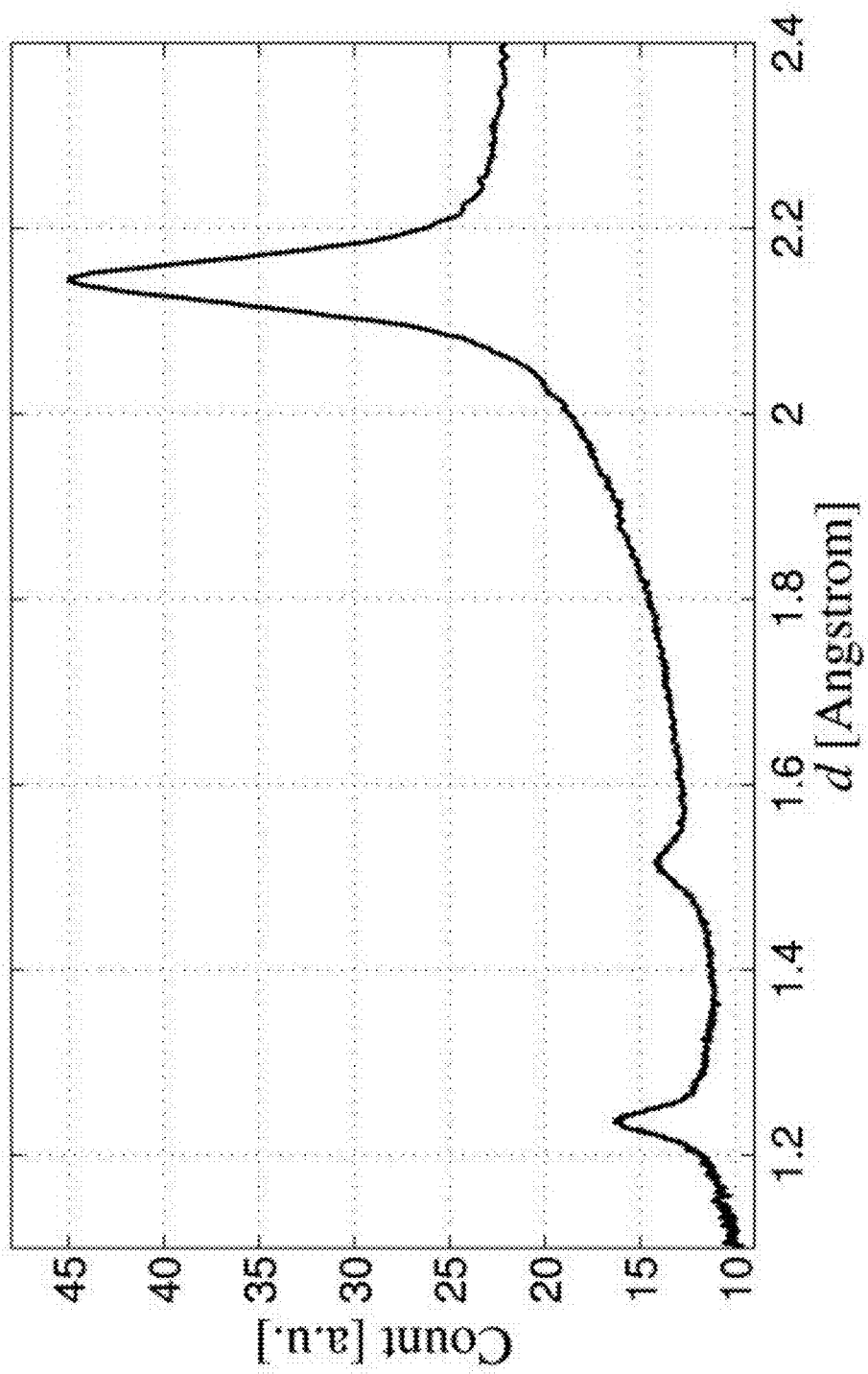
FIG. 2E is a SAED analysis of lithium fluoride nanoparticles similar to the nanoparticles shown in FIG. 2D, in accordance with some embodiments.

FIG. 2E is a SAED analysis of lithium fluoride nanoparticles produced using plasma deposition, in accordance with some embodiments. The following values were identified for these nanoparticles: (a) determined d-space: 2.488 Angstrom; (b) expected d-spacing value: 2.32557+3-7% (2.3953-2.48835 Angstrom); (c) peak shift: +5%; and (d) uncertainty due to small number of samples (i.e., dots): ±2%. These results validated the effectiveness of the lithium fluoride synthesis described above.

Figure 2F:
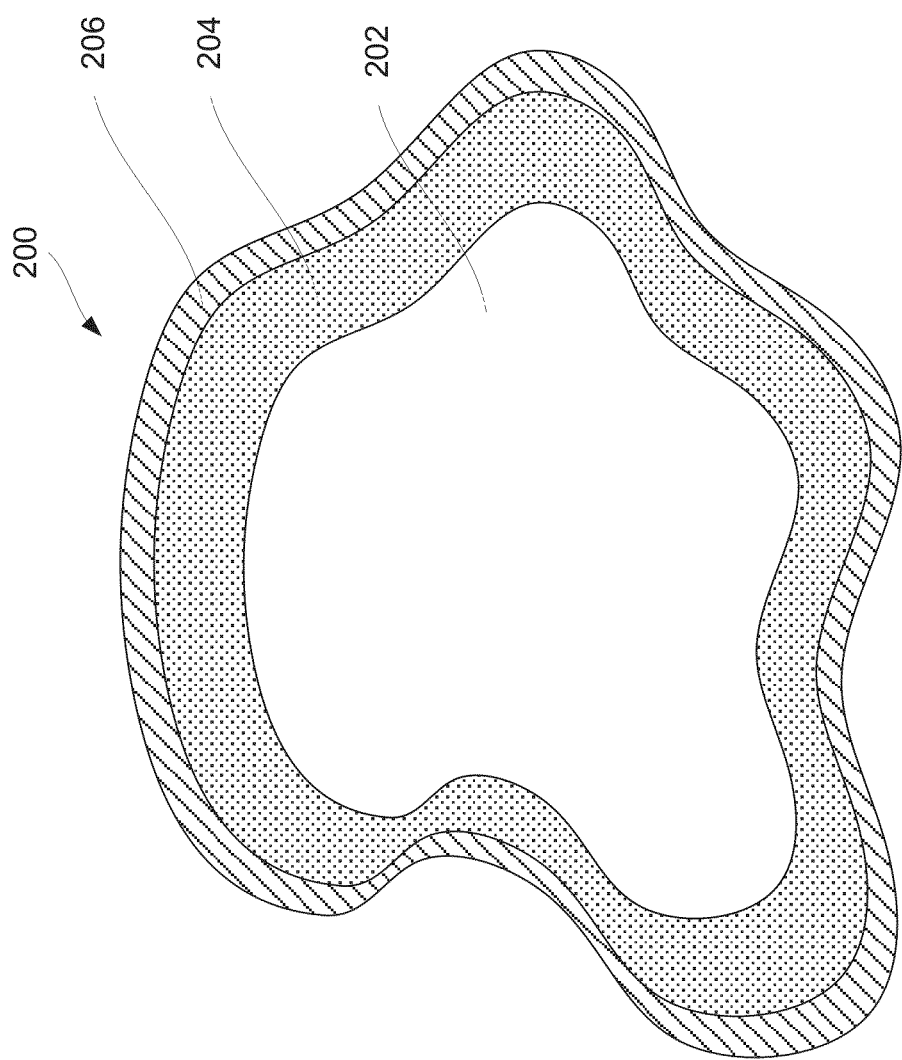
FIG. 2F is a schematic representation of a particle of the electrode active material produced using plasma deposition, in accordance with some embodiments.

FIG. 2F is a schematic representation of nanoparticle 200 of an electrode active material produced using plasma deposition, in accordance with some embodiments. Nanoparticle 200 may have core 202, which may include substantially metal, such as iron and/or cobalt. The average size of core may be between about 1 nanometer and 10 nanometers or, more specifically, between about 3 nanometers and 8 nanometers. Nanoparticle 200 may also have first shell 204, which may be also referred to as an inner shell. First shell 204 may be formed from lithium fluoride and may have a thickness of between about between about 1 nanometer and 30 nanometers or, more specifically, between about 5 nanometers and 20 nanometers. Nanoparticle 200 may also have second shell 206, which may be also referred to as an outer shell. Second shell 206 may be formed from carbon and may have a thickness of between about between about 1 nanometer and 50 nanometers or, more specifically, between about 2 nanometers and 10 nanometers.

Overall, nanoparticle 200 may have the mean particle size ranging 1 nanometer to 30 nanometers or, more specifically, ranging 2 nanometer to 10 nanometers. The nanoparticles may have a uniform size.

The nanoparticles of the electrode active material may be used for a variety of applications, such as high energy density batteries or, more generally, energy storage applications. Other possible applications include energy conversion (e.g., solar cells), catalysts, cosmetics and biological sensors. Other variations, modifications, and alternatives are also within the scope.

Apparatus Examples

Figure 3:
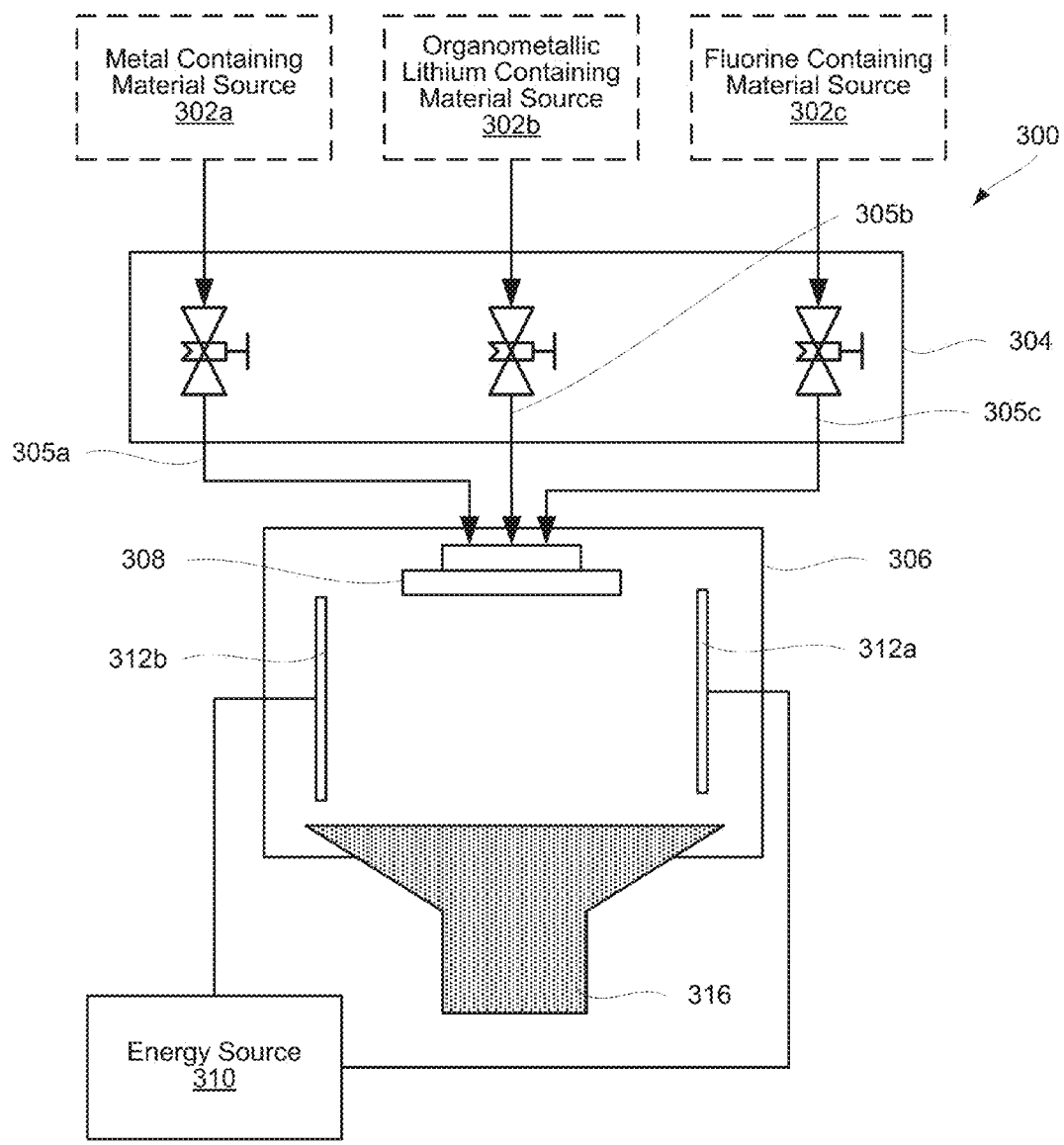
FIG. 3 is a schematic illustration of an apparatus for fabricating electrode active material produced using plasma deposition, in accordance with some embodiments.

FIG. 3 is a schematic illustration of apparatus 300 for fabricating electrode active material produced using plasma deposition, in accordance with some embodiments. Specifically, apparatus 300 is designed to executed various operations of the method describe above. Apparatus 300 may include a feed device 304 having first delivery line 305a for a metal containing material, second delivery line 305b for an organometallic lithium containing material, and third delivery line 305c for a fluorine-containing material. First delivery line 305a may be connected to metal containing material source 302a, second delivery line 305b may be connected to organometallic lithium containing material source 302b, and third delivery line 305c may be connected to fluorine-containing material source 302c. These sources may be parts of apparatus 300 or may be standalone components. The sources may be processing devices for sublimating and/or evaporating precursors to form materials supplied to apparatus 300. In some embodiments, one or more precursors may be sprayed in the apparatus. In some embodiments, metal containing material source 302a may be plasma reactor for forming metal nanoparticles that are carried in by a gas flow to feed device 304.

Apparatus 300 may also include flow reactor 306 connected to the delivery lines. More specifically, the delivery lines may be connected to distribution device 308 disposed within flow reactor 306 of apparatus 300. Flow reactor 306 or, more specifically, distribution device 308 may be configured to mix the metal containing material, organometallic lithium containing material, and fluorine-containing material and to form a mixture of these materials. Apparatus 300 also includes energy source 310 coupled to flow reactor 306 to apply energy to the mixture thereby forming plasma from the mixture. Specifically, flow reactor 306 may include electrodes 312a and 312b and energy source 310 may apply a high voltage to these electrodes generating an electrical discharge through the mixture. Apparatus 300 may also include collector 316 coupled to flow reactor 306 to capture nanoparticles of the electrode active material formed from the mixture.

Flow reactor 306 may be a fluidized bed reactor and may include a heating device to maintain the temperature of the mixture.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method for forming an electrode active material for an electrochemical cell, the method comprising:
   providing a non-lithium metal containing material, an organo-metallic lithium containing material, and a fluorine-containing material;
   mixing the non-lithium metal containing material, the organo-metallic lithium containing material, and the fluorine-containing material thereby forming a mixture, wherein mixing the non-lithium metal containing material, the organo-metallic lithium containing material, and the fluorine-containing material is performed using a flow reactor; and
   applying energy to the mixture using an energy source, wherein applying the energy to the mixture forms plasma,
   wherein the plasma is formed from the mixture,
   wherein the plasma forms nanoparticles of the electrode active material,
   wherein the nanoparticles comprise a non-lithium metal, lithium, fluorine, and carbon, and
   wherein the nanoparticles have a mean particle size ranging 1 nanometer to 30 nanometers.

2. The method of claim 1, further comprising evaporating one or precursors thereby forming one or more of the non-lithium metal containing material, the organo-metallic lithium containing material, and the fluorine-containing material.

3. The method of claim 1, wherein the non-lithium metal containing material or a precursor for the non-lithium metal containing material comprises at least one of ferrocene (Fe$(C_5H_5)_2$), cobaltocene (Co$(C_5H_5)_2$), iron pentacarbonyl (Fe$(CO)_5$), dicobaltoctacarbonyl (Co$_2$(CO)$_8$), and iron chloride (FeCl$_3$).

4. The method of claim 1, wherein the organo-metallic lithium containing material or a precursor for the organo-metallic lithium containing material comprises at least one of alkyl lithium and lithium 2,2,6,6-tetramethyl-3,5-heptanedionate.

5. The method of claim 4, wherein the alkyl lithium is at least one of butyl lithium, methyl lithium, and hexyl lithium.

6. The method of claim 1, further comprising evaporating a precursor of the organo-metallic lithium containing material thereby forming the organo-metallic lithium containing material,
   wherein the precursor of the organo-metallic lithium containing material comprises a solvent having a boiling temperature of less 100° C. and being free from oxygen.

7. The method of claim 6, wherein the solvent is hexane.

8. The method of claim 1, wherein the fluorine-containing material or a precursor of the fluorine-containing material comprises at least one of ammonium bi-fluoride (NH$_4$HF$_2$) and ammonium fluoride (NH$_4$F).

9. The method of claim 1, further comprising evaporating a precursor of the fluorine-containing material, wherein the precursor of the fluorine-containing material is solid.

10. The method of claim 1, wherein an atomic ratio of a non-lithium metal of the non-lithium metal containing material to lithium of the organo-metallic lithium containing material is about 1:3.

11. The method of claim 1, wherein an atomic ratio of the non-lithium metal of the non-lithium metal containing material to fluorine of the fluorine-containing material is about 1:1.

12. The method of claim 1, wherein a pressure of the flow reactor pressure is maintained at between about 5 Torr and 500 Torr.

13. The method of claim 1, wherein the energy source comprises a pair of electrodes exposed to the mixture when applying the energy to the mixture.

14. The method of claim 1 wherein the energy is applied in pulses.

15. The method of claim 1, wherein the nanoparticles have a mean particle size ranging 1 nanometer to 20 nanometers.

16. The method of claim 1, wherein the nanoparticles have a mean particle size ranging 1 nanometer to 10 nanometers.

17. The method of claim 1, further comprising, prior to forming the mixture, forming the non-lithium metal containing material from a precursor of the non-lithium metal containing material,
   wherein the non-lithium metal containing material comprises nanoparticles, wherein forming the non-lithium metal containing material comprises applying energy to the precursor of the non-lithium metal containing material, and wherein applying the energy to the precursor of the non-lithium metal containing material forms plasma from the precursor of the non-lithium metal containing material.

18. The method of claim 17, wherein each of the nanoparticles of the electrode active material comprises a non-lithium metal core and a lithium fluoride shell.

19. The method of claim 1, wherein further comprising:
fabricating a positive electrode using the nanoparticles of the electrode active material; and
fabricating the electrochemical cell using the positive electrode.

* * * * *